United States Patent
Shazly et al.

(10) Patent No.: US 10,664,389 B2
(45) Date of Patent: *May 26, 2020

(54) SYSTEM TESTING USING TIME COMPRESSION

(71) Applicant: International Business Machines Corporation, Armonk, NY (US)

(72) Inventors: Hassan A. Shazly, Columbia, SC (US); Debra K. Wagner, Louisville, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,848

(22) Filed: Dec. 12, 2017

(65) Prior Publication Data
US 2018/0101470 A1 Apr. 12, 2018

Related U.S. Application Data

(63) Continuation of application No. 15/218,343, filed on Jul. 25, 2016.

(51) Int. Cl.
*G06F 11/36* (2006.01)

(52) U.S. Cl.
CPC ...... *G06F 11/3688* (2013.01); *G06F 11/3696* (2013.01)

(58) Field of Classification Search
CPC .................. G06F 11/3688; G06F 11/3696
See application file for complete search history.

(56) References Cited

U.S. PATENT DOCUMENTS

| 6,226,765 | B1 | 5/2001 | Le et al. | |
|---|---|---|---|---|
| 6,532,561 | B1 | 3/2003 | Turnquist et al. | |
| 7,313,564 | B2 * | 12/2007 | Melamed | G06F 11/3684 707/999.01 |
| 7,472,388 | B2 * | 12/2008 | Fukunari | G06F 11/0715 700/17 |
| 7,539,992 | B2 * | 5/2009 | Takemura | G06F 8/10 703/21 |
| 7,779,413 | B2 * | 8/2010 | Suzuki | G06F 9/5044 718/102 |

(Continued)

FOREIGN PATENT DOCUMENTS

CN 202049351 U 11/2011

OTHER PUBLICATIONS

TimeShiftX, 2013, Vornex, Inc.*

(Continued)

*Primary Examiner* — Jae U Jeon
*Assistant Examiner* — Douglas M Slachta
(74) *Attorney, Agent, or Firm* — Konrad Raynes Davda & Victor LLP; Janaki K. Davda

(57) ABSTRACT

Provided are techniques for system testing using time compression.
A first program and a second program of a workload are executed in accordance with a test clock, wherein the test clock is independent of a computer system clock, and wherein the first program and the second program are to be run in a specified sequence and each at a specified date and time. In response to the first program completing, the test clock is dynamically updated to the specified date and time of the second program to start execution of the second program.

7 Claims, 12 Drawing Sheets

(56) References Cited

U.S. PATENT DOCUMENTS

| | | | | |
|---|---|---|---|---|
| 8,024,299 | B2* | 9/2011 | Dias | G06F 17/30286 707/660 |
| 8,381,219 | B2* | 2/2013 | Boris | G06F 9/5083 370/252 |
| 8,650,545 | B2* | 2/2014 | Dybas | G06F 17/30156 717/124 |
| 8,677,196 | B1 | 3/2014 | Gregor et al. | |
| 9,514,037 | B1* | 12/2016 | Dow | G06Q 10/06315 |
| 9,852,290 | B1* | 12/2017 | Kirk | G06F 21/53 |
| 2003/0212989 | A1* | 11/2003 | Rokosz | G06F 11/3672 717/135 |
| 2004/0107415 | A1* | 6/2004 | Melamed | G06F 11/3684 717/124 |
| 2006/0117274 | A1* | 6/2006 | Tseng | G06F 17/5022 716/106 |
| 2006/0123115 | A1* | 6/2006 | Satomi | G06F 9/5044 709/226 |
| 2006/0242648 | A1* | 10/2006 | Guccione | G06F 9/4881 718/105 |
| 2007/0150815 | A1* | 6/2007 | Smith | G06F 8/65 715/733 |
| 2009/0055805 | A1* | 2/2009 | Dow | G06F 11/3612 717/128 |
| 2010/0257513 | A1* | 10/2010 | Thirumalai | G06F 11/3428 717/134 |
| 2011/0067031 | A1* | 3/2011 | Hosokawa | G06F 1/3231 718/102 |
| 2011/0145795 | A1* | 6/2011 | Khanapurkar | G06F 11/3414 717/126 |
| 2012/0297366 | A1* | 11/2012 | Andrews | G06F 11/3688 717/124 |
| 2013/0117611 | A1* | 5/2013 | Chakraborty | G06F 11/3672 714/33 |
| 2013/0218549 | A1* | 8/2013 | Sultan | G06F 9/455 703/19 |
| 2014/0089701 | A1* | 3/2014 | Kato | G06F 9/4837 713/323 |
| 2015/0095889 | A1* | 4/2015 | Kawahara | G06F 11/3668 717/124 |
| 2017/0337313 | A1* | 11/2017 | Abdul | G06F 17/5045 |

OTHER PUBLICATIONS

Time Machine Benefits & Overview, 2013, SolutionSoft Systems, Inc.*

Gunter Lenhardt, "Time Travel in software testing", TestZonen, Apr. 15, 2013 (Year: 2013).*

"Fact Sheet: Xpediter/Xchange Identify, Simulate and Test Date and Time-Sensitive Applications", 2014, Compuware Corporation (Year: 2014).*

Chiang, C.J., A. Poylisher, Y. Gottlieb, and C. Serban, Cyber Testing Tools and Methodologies: Presentation at ITEA, Nov. 13, 2013. Available from the Internet at <URL: http://www.itea.org/images/pdf/conferences/2013_Annual/Track_3_C_Jason_Chiang_and_Alex_Poylisher_and_Yitzchak_and_Gottlieb_and_Constantin_Serban.pdf>, Total 16 pp.

Graham, D. and M. Fewster, "Experiences of Test Automation", Copyright © 2012 Pearson Education, Inc. Available from the Internet at <URL: http://www.informit.com/articles/article.aspx?p=1826411&seqNum=8>, Total 671 pp.

Halfpenny, A., "Methods for Accelerating Dynamic Durability Tests", 9th International Conference on Recent Advances in Structural Dynamics, Southampton, UK, 2006. Available from the Internet at <URL: http://www.ncode.com/fileadmin/mediapool/nCode/downloads/Whitepaper_nCode_MethodsforAcceleratingDynamicDurabilityTests_v2-Halfpenny.pdf>, Total 19 pp.

ip.com, "Simulation Programming Interface for Designing Programs for Testing and Verifying Hardware", IP.com No. 000206416. Retrieved from the Internet at <URL: http://ip.com/IPCOM/000206416>, Apr. 25, 2011, Total 7 pp.

ip.com, "System and Method for Integrating Legacy Instruments in an LXI Based Test and Measurement System", IP.com No. 000169165. Retrieved from the Internet at <URL: http://ip.com/IPCOM/000169165>, Apr. 8, 2008, Total 5 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grange, "The NIST Definition of Cloud Computing (Draft)", Sep. 2011, Computer Security Division Information Technology Laboratory National Institute of Standards and Technology, Total 7 pp.

Motorola and W.J. Rinderknecht, "Improved Testability of Integrated Circuits using Synchronization to a Test Clock for High Speed Digital Signals", Mar. 11, 2011, IP.com No. 000204900. Retrieved from the Internet at <URL: http://ip.com/IPCOM/000204900>, Total 6 pp.

Solution-Soft Inc., "Time Machine and Virtual Clock Speed". Retrieved from the Internet at <URL: http://www. solution-soft.com/sites/default/files/wysiwyg/Virtual%20Clock%20Speed.pdf>, Apr. 17, 2015, Total 2 pp.

Solution-Soft Inc., "Time Machine® | Virtual Clock for Time Shift and Application Testing", [online], [Retrieved on Apr. 7, 2016]. Available from the Internet at <URL: http://www.solution-soft.com/products/time-machine,> Copyright 2016, Total 8 pp.

English Abstract and Machine Translation for CN202049351U, published on Nov. 23, 2011, Total 8 pp.

List of IBM Patents or Patent Applications Treated as Related, Dec. 12, 2017, Total 2 pp.

Preliminary Amendment, dated Dec. 12, 2017, for U.S. Appl. No. 15/218,343, filed Jul. 25, 2016 by H.A. Shazly et al., Total 5 pp. [57.372 (PrelimAmend)].

U.S. Patent Application with U.S. Appl. No. 15/218,343, filed Jul. 25, 2016, entitled "System Testing Using Time Compression", invented by H.A. Shazly et al., Total 44 pp. [57.372 (Appln)].

Office Action 1, dated Mar. 12, 2018, for U.S. Appl. No. 15/218,343, filed Jul. 25, 2016 by H.A. Shazly et al., Total 30 pp. [57.372 (OA1)].

Response to Office Action 1, dated Jun. 7, 2018, for U.S. Appl. No. 15/218,343, filed Jul. 25, 2016 by H.A. Shazly et al., Total 10 pp. [57.372 (ROA1)].

Final Office Action for U.S. Appl. No. 15/218,343, pp. 28, dated Sep. 20, 2018.

Response to Final Office Action for U.S. Appl. No. 15/218,343, pp. 10, dated Jan. 11, 2019.

Office Action 3, dated Feb. 25, 2019, for U.S. Appl. No. 15/218,343, 29 pp., [57.372 (OA3)].

Response to Office Action 3, dated May 24, 2019, for U.S. Appl. No. 15/218,343, 10 pp., [57.372 (ROA3)].

Final Office Action 2 for U.S. Appl. No. 15/218,343, 32 pp., dated Sep. 6, 2019 [57.372 (FOA2)].

Response to Final Office Action 2 for U.S. Appl. No. 15/218,343, 12 pp., dated Dec. 23, 2019 [57.372 (RFOA2)].

Notice of Allowance 1 for U.S. Appl. No. 15/218,343, 14 pp., dated Jan. 13, 2020.

* cited by examiner

\*\*Example of production system workload XML file that describes the production system
workload types based on a daily timeline over a course of one year ⟶300

```
<?xml version="1.0" encoding="UTF-8"?>
<sysWorkload xmlns:xsi="http://www.w3.org/2001/XMLSchema-instance"
    xsi:noNamespaceSchemaLocation="d:/work/test/load/sysworkload.xsd">

<WorkloadId name="Daily1"
    <test number="1" name="Retrieve1" startTime="05:00:00" iterations="4">   </test>
    <test number="2" name="Store1" startTime="05:00:00" numberofStores="1" > </test>
    <test number="3" name="Retrieve2" startTime="08:00:00" iterations="6" >  </test>
</ WorkloadId>

<WorkloadId name="Daily2"
    <test number="1" name="Retrieve3" startTime="17:00:00" iterations="22">  </test>
    <test number="2" name="Store2" startTime="17:00:00" numberofStores="1">  </test>
</ WorkloadId>

<WorkloadId name="Random1"
    <audit name="Audit" startTime="10:00:00" > </audit>
</ WorkloadId>

<WorkloadId name="Monthly1"
    <salesCampaign name="Sales Campaign" startTime="13:30:00" > </salesCampaign>
</ WorkloadId>

</sysWorkload>
```

FIG. 3

**Example of a test scenario XML file in which each test scenario describes the different daily workloads to be executed and an order in which to execute as follows:
  scenario1 = day1 // normal days run plus an audit occurred on that day
  scenario2 = daily processing, end of week processing, and end of month processing
  scenario3 = daily processing, end of month processing, and end of year processing  ⎯400

```
<?xml version="1.0" encoding="UTF-8"?>
<testScenarios xmlns:xsi="http://www.w3.org/2001/XMLSchema-instance"
    xsi:noNamespaceSchemaLocation="d:/work/test/load/testscenarios.xsd">
<scenario>
  <work id="Scenario1">                      <- scenario name
    <id name="Daily1" > </id>                <- workload ID
    <id name="Random1" > </id>
    <id name="Daily2" > </id>
  </work>

<work id="Scenario2">
    <id name="Daily1" > </id>
    <id name="Weekly1" > </id>
    <id name="Monthly1" > </id>
  </work>

<work id="Scenario3">
    <id name="Daily1" > </id>
    <id name="Monthly1" > </id>
    <id name="Yearly1" > </id>
  </work>

</scenario>
</testScenarios>
```

FIG. 4

**Example of system under test information XML file that describes the system used for testing

― 500

```
<?xml version="1.0" encoding="UTF-8"?>
<sysinfo xmlns:xsi="http://www.w3.org/2001/XMLSchema-instance"
    xsi:noNamespaceSchemaLocation="d:/work/test/load/sysinfo.xsd">
    <sysdata>
        <system id="ARCHIVE1">
            <ROLE>East Coast Production Server</ROLE>
            <IPADDR>server1.us.company.com</IPADDR>
            <USERID>USER1</USERID>
            <PASSWORD>password</PASSWORD>
        </system>
        <system id="ARCHIVE2">
            <ROLE>West Coast Production Server</ROLE>
            <IPADDR>server2.us.company.com</IPADDR>
            <USERID>USER2</USERID>
            <PASSWORD>password2</PASSWORD>
        </system>
    </sysdata>
</sysinfo>
```

FIG. 5

SYSTEM TESTING USING TIME COMPRESSION

FIELD

Embodiments of the invention relate to system testing using time compression, where the system may be a production system.

BACKGROUND

During a software development process, code under development goes through a series of different types of testing, typically starting with unit testing and ending with performance/scalability testing. These tests are conducted in a series of environments (system or logical partitions (LPARs)) that simulate a real production system. A system may be described as a node with one or more processors, memory, and Input/Output (I/O) capabilities. A logical partition may be described as a virtual computer that has access to a subset of a computer's hardware resources (i.e., the physical computer may be partitioned into multiple logical partitions with separate operating systems).

The testing is done to simulate a certain set of actions that cover a certain amount of time. For example: a "query and retrieval" test may be set up to simulate some number of users (e.g., several hundred) concurrently accessing the system for a finite amount of time (e.g., 24 hours).

Another test may be a run that "loads/stores" data into the system. The test may be designed such that an amount of data (e.g., 200 GigaBytes (GBs)) is stored within a given time period (e.g., a 3 hour period). This test identifies the system's ability to load data within the given time period.

While all of this testing is good, the problem is that in "real life" there are:

1) a varying number of transaction rates throughout the day, throughout the month and throughout one or more years, as well as, one-time events (e.g., system audits); and 2) a varying number of transaction types throughout the same time periods. For example, the data "search and retrieve" rates may vary over the various time horizons, and the data "load/store" rates may vary over the time horizon.

As a result of such variance, the result is that, over extended time periods, the workload on the production system does not match the workloads induced during testing.

The need to test the workload effects (of one or more subsystem components) on a "production like" system over a long time period (or a replication of a long time period) have become more and more critical. This problem is becoming more severe as system workloads increase with the move to big data and cloud implementations.

SUMMARY

Provided is a method for system testing using time compression. The method comprises: executing, using a processor of a computer, a first program and a second program of a workload in accordance with a test clock, wherein the test clock is independent of a computer system clock, and wherein the first program and the second program are to be run in a specified sequence and each at a specified date and time; and, in response to the first program completing, dynamically updating the test clock to the specified date and time of the second program to start execution of the second program.

Provided is a computer program product for system testing using time compression. The computer program product comprises a computer readable storage medium having program code embodied therewith, the program code executable by at least one processor to perform: executing a first program and a second program of a workload in accordance with a test clock, wherein the test clock is independent of a computer system clock, and wherein the first program and the second program are to be run in a specified sequence and each at a specified date and time; and, in response to the first program completing, dynamically updating the test clock to the specified date and time of the second program to start execution of the second program.

Provided is a computer system for system testing using time compression. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: executing a first program and a second program of a workload in accordance with a test clock, wherein the test clock is independent of a computer system clock, and wherein the first program and the second program are to be run in a specified sequence and each at a specified date and time; and, in response to the first program completing, dynamically updating the test clock to the specified date and time of the second program to start execution of the second program.

BRIEF DESCRIPTION OF THE SEVERAL VIEWS OF THE DRAWINGS

Referring now to the drawings in which like reference numbers represent corresponding parts throughout:

FIG. 3 illustrates an example of a production system workload file as an Extensible Markup Language (XML) file in accordance with certain embodiments.

FIG. 4 illustrates an example of a test scenario file that may include one or more test scenarios represented as an XML file in accordance with certain embodiments.

FIG. 5 illustrates an example of a system under test information file as an XML file in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide automated variable time compression to avoid missing: the interactions between the mix of transaction types, these same interactions occurring at varying rates, and the effects of running the workload on the system as more and more data is stored and deleted over long time periods. With embodiments, variable time compression replicates the true processing workload and environment that occurs on the production system in a reduced time period.

Previous attempts at time compression, while yielding testing improvements, basically just shift the time at which the tests occur. The tests that are then run are "the normal" simulation of a production load. Also, since these tests do not employ the concept of variable time compression, they are limited in the time horizon that they can be run for. Typically they are run to simulate an event that would occur in the next few days. In contrast, variable time compression allows for the replication (versus simulation) of the production systems (or subsystems) workload over an extended time period (years to multiple years).

With embodiments, the word "test" is used to mean the running of one or more production workloads on the system under test (which may also be referred to as the test system).

Embodiments provide use of variable time compression to avoid various processing bottlenecks (e.g., performance) and, in the worst case system outages.

Embodiments introduce the idea of one or more test clocks that are independent of the computer system clock in the sense that they can be accessed, set and/or "accelerated" as needed. These "clocks" allow for the system under test time to be manipulated, such that testing may be performed against different time periods. Embodiments also provide a mechanism that allows for automating the testing process while utilizing the concept of time compression (time travel).

Figure 1:
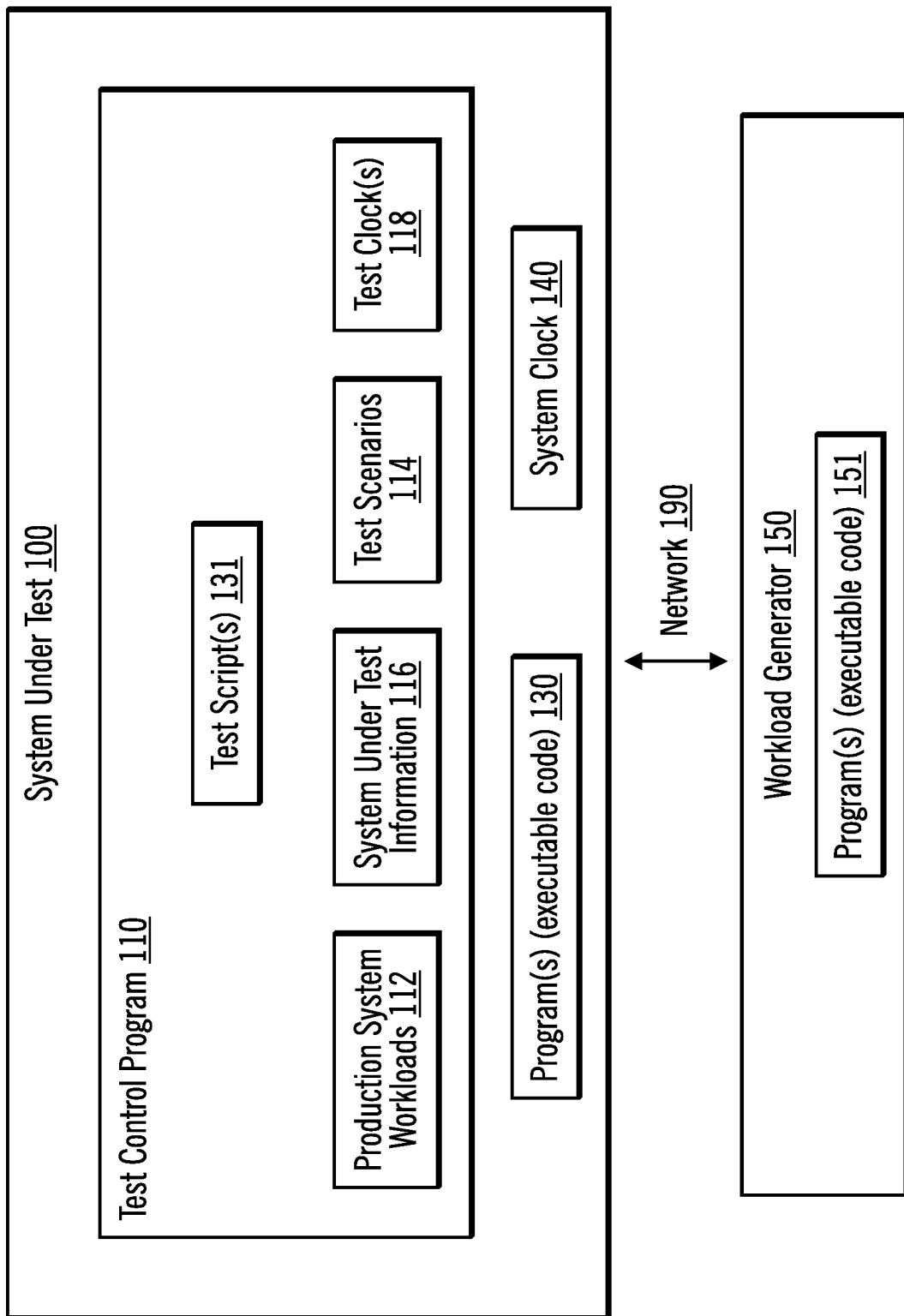
FIG. 1 illustrates, in a block diagram, a computing environment in accordance with certain embodiments.

FIG. 1 illustrates, in a block diagram, a computing environment in accordance with certain embodiments. A system under test 100 includes a test control program 110, one or more programs (executable code) 130, and a system clock 140.

The test control program 110 includes one or more test scripts 131, one or more production system workload files 112 ("workload files"), one or more test scenarios files 114, a system under test information file 116, and one or more test clocks 118. In certain embodiments, there are multiple test clocks. A test script 131 identifies test scenarios to be executed, while a test scenario file provides details of the test scenarios. The test scenarios are composed of workloads, and details of the workloads are in the production system workload file 112.

The system under test 100 is coupled to a workload generator 150. Coupling is achieved through a network connection, communication facility or shared network drive 190. The workload generator 150 by executing the program(s) (executable code) 151 generates one or more workloads for the system under test 100.

Embodiments provide production system replication using variable time compression with:

The testing is data driven. The system under test and the workload are defined in data files. The workload file information may be manually entered or may be created from system logs that monitor the work that is performed on the production-system. The production system (or subsystem) components to be replicated are defined in the test script file. The testing process then reads this test script file and proceeds to run the replication.

Time that is variably controlled (not manually or statically) by the test scripts based on the runtime of the executing code (programs). Thus, when a process is complete, time between this process and the next scheduled process to be run is eliminated. Event refers to a specific task, such as "end of month payroll generation", process refers to the actual running of the program that executes the event (e.g., generates the payroll).

A workload that is executed is the real system workload, not more (stress test) or less (elimination of light workloads). This allows for the interaction between the various components to be taken into account. It also allows for the time effect, for example the growth of databases or file systems over time and the effect of database reorganizations, to be taken into account.

A test clock, which is a "virtual clock", that provides for time synchronization across multiple LPARs (or systems) and is intelligent. The test clock does not simply keep track of time, instead, the test clock keeps track of the code progression and may modify (compress) the time based on the progression of the executing code.

Code execution compression is optionally effected by de-duplication (or eliminating) process scenarios that are repeated multiple times.

Thus, embodiments provide a solution to software testing of time-based events through automation, variable time compression, de-duplication of test case execution, and time slice elimination. By making use of automated variable time compression, de-duplication, and time slice elimination, time compression may be maximized for the replication workload processing over extended time periods.

In many products, there are time-based events, such as expiration, migration, maintenance, scheduled, minimum or maximum waiting periods, delayed processing, periodic events, inactive time periods, etc. Customers may report problems that are directly related to time-based events. Thus, embodiments create a test environment that creates real time-based events without having to wait in "real" time.

Embodiments solve the problem of system testing (e.g., "production system testing") by using variable time compression. That is, embodiments take all the activity (e.g., functions) that would have happened on a production system over an elongated time period (e.g., one year) and perform these activities within a compressed time period (e.g., one week) through "time compression".

Embodiments use an independent clock referred to as the test clock 118 and integrate this with the concepts of:
1. de-duplicating test case execution;
2. dynamic setting of the time of the test clock 118 based on test progress;
3. focusing on specific test areas in order to allow for drastic time slice elimination; and
4. driving the test progression through time using a test control program and a series of configuration files created for example in Extensible Markup Language (XML).

With embodiments, the amount of compression achieved is a function of the variability (and randomness) within the data to be compressed. The time compression value achieved may vary by implementation (e.g., based on test objectives, test "breadth" desired outcomes, etc.).

For example, with embodiments: The least amount of time compression may be obtained by running a complete replication of all system activity over a one year period. This is because there are many different test types that get executed with different intensity throughout the time period (e.g., high variability in the data).

A between test tie is the time during which the computer system is not performing any work. So, for example, if a program to "load data" is scheduled to run at 6:00 pm and completes its work by 6:30 pm, and the next program to "reorganize the database" is scheduled to run at 8:00 pm, then during the time period from 6:30 to 8:00 pm, the computer system is idle. This time period is the between test times and is the time period that would be eliminated by embodiments. So, in this case, as soon as the "load data" program finishes at 6:30, the test clock moves forward to 8:00 pm, and the next program "data reorganization" starts running. With embodiments, the time from 6:30 pm to 8:00 pm, which is the between test time, is eliminated, and the computer is not left idle.

So, for example, assuming that there are no between test times and there is de-duplication, then:
Daily workload=once per week=52 times per year
End of week workload=once per week=52 times per year
End of month workload=1 per month=12 times per year
This results in 365 days (1 year) being compressed into 116 days, which is a 3:1 compression ratio.

In another example, the most amount of time compression may be obtained by testing a single function and its related activity over a long time period. For example, loading, retrieving, and expiring a specific type of data over a 7 year period.
Data load time=2 minutes=run daily (×365 (yearly)×7 yrs=5,110 minutes)
Data retrieve time=3 minutes (replication 100,000 retrieves)=run daily (7,665 minutes)
Expiring the loaded data=60 minutes (run once at end of 7 year period)
For a total execution time of 5,110+7,665+60=12,835 minutes=214 hours=9 days.
This would result in 2,555 days (7 years) being compressed into 9 days, which is a 284:1 compression ratio.

Throughout testing, the production system replication test time is being variably compressed. With variable time compression, for the task/component/module that is being tested (executed), time progresses at its normal rate. So, for example, if loading data takes two minutes in "real time", during the test, the elapsed time will also be two minutes. Then, if the next activity is a database reorganization that is scheduled to take place in two hours (with no other activity in between), these two hours are compressed into zero hours, and the database reorganization runs immediately after the load process completes. This results in the removal of "dead/wasted" time from the test system and in an overall reduction in the amount of time taken to run the whole production replication test.

Thus, the actual amount of time/processing compression that may be achieved is mainly a function of the amount of test de-duplication and between test times that are eliminated.

With embodiments using time compression to replicating a true production system workload:
1) the testing is completed in a relatively short time period versus the real time period that it is replicating
2) the testing is done against the most possible realistic workload (based on the modeling accuracy). (The modelling accuracy is how well the test workload matches the real production system workload. So, for example, if embodiments are trying to figure out the long term effect of loading and unloading data, then the model should include all the load and unload events (processing cycles) and remove all the retrieval events since they have no effect on this process. But, if some of the load or unload events are removed, then the model becomes inaccurate since this is no longer replicating the exact production system);
3) the workload changes over time are taken into account (weekday, weekend, end of month, end of quarter, end of year, vacation, unique events (audit));
4) the interactions between the various workloads are also taken into account;
5) the testing process is a layer built on top of the existing test cases to execute the actual tests (so no change needs to be made to existing test cases);
6) the "load" on the test system remains at close to 100% during the entire test period, thus increasing the likelihood of detecting any system failures (due to overloading or component interaction);
7) the test results enhance the systems behavior prediction reliability of the current testing techniques.

Figure 2:
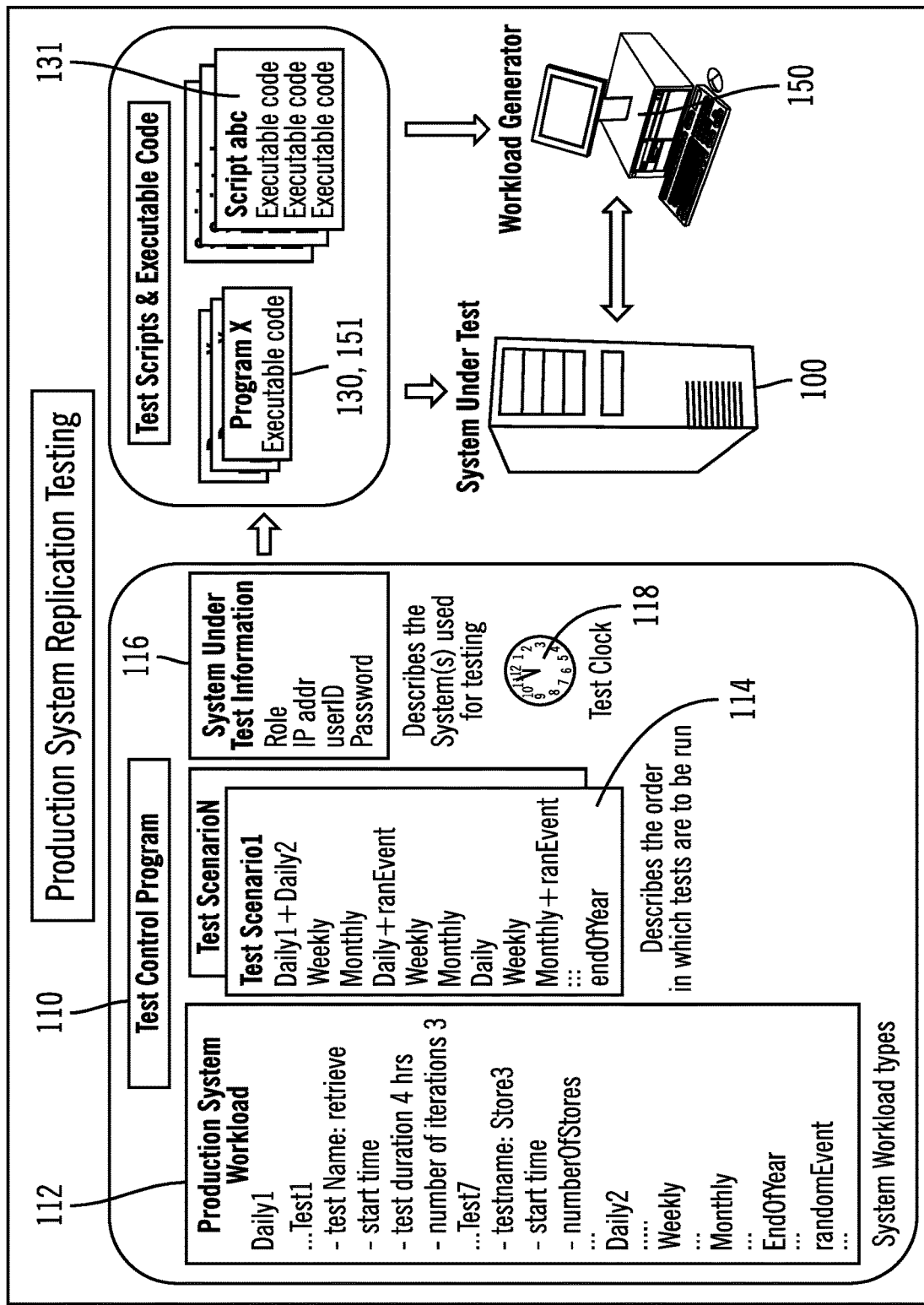
FIG. 2 illustrates, in a block diagram, an alternative computing environment in accordance with certain embodiments.

FIG. 2 illustrates, in a block diagram, an alternative computing environment in accordance with certain embodiments. In FIG. 2, the elements of FIG. 1 are illustrated in an alternative way for ease of understanding the interaction between the elements.

In FIG. 2, there is a system under test 100, a workload generator 150, existing programs (executable code) 130 and test scripts 131. In FIG. 2, there is a system under test (on which embodiments replicate the production workload) that includes a production system workload file 112, a test scenario file 114, a system under test information file 116, a test control program 110, and a test clock 118.

The system under test 100 is the system being tested. The system under test 100 may consist of a single LPAR, multiple LPARs, a single system or multiple systems. The production system replicated by the system under test 100 provides the organization's functionality. Functionality refers to the organization's production system (e.g., storing, processing, and providing data to users, such as for payroll or web serving) to be tested.

The workload generator 150 generates workloads against the system under test 100. The workloads may be for data storage, data querying, data retrieval, or any other kind of workload based on the system's 100 functionality. The amount of work generated by the workload generator 150 may vary according to the specific test requirements specified in the test script files 131. There may be one or more workload generators 150 on a single system, multiple systems, one or more LPARS on the system under test 100 or any other appropriate computing device.

Existing programs 130 and 151 (executable code) and existing test scripts 131 are the existing executable code and test cases that are executed for testing in the current environment.

The production system replication testing includes a test control program 110, which includes a production system workload file 112, test scenario files 114, a system under test information file 116, test scripts 131, and a test clock 118.

The production system workload file 112 is a data file that describes the various production workloads that may be placed on the system under test 100. In certain embodiments, the data file is an XML, file. In other embodiments, the data file may be implemented in any manner that describes the overall production system workload.

FIG. 3 illustrates an example of a production system workload file 300 as an XML file in accordance with certain embodiments. The production system workload file 300 represents the work that is normally done on the production system during the normal course of business. This is the workload to be replicated with the testing. The production system workload file 300 describes the different workloads by frequency (daily, weekly, monthly, yearly) to capture varying workload activities throughout time. The production system workload file 300 describes event driven activities that are captured by random Event entries that capture events, such as audits, sale campaigns, etc. The production system workload file 300 describes different usage patterns that are described, for example, by having a Daily1, Daily2, Random 1, and Monthly1 entries These are the events that run on the system under test 100. Each of these entries describes different system usages on a daily basis. So, for example in a banking scenario, daily access patterns by tellers may be very different from daily access patterns of the bank customers. Each of the entries describe the programs 130, 151 and test scripts 131 to be executed on the system under test 100 in order to replicate the production system components being tested. For production system workload file 300, the programs 130 and test scripts 131 are: Retrieve1, Store1, Retrieve2, Retrieve3, Store 2, Audit, and Sales Campaign.

A test scenario file 114 is a data file that describes the test sequence in terms of a sequence of workloads imposed on the system under test 100 over specified time periods. In certain embodiments, the data file is an XML file. In other embodiments, the data file may be implemented in any manner that describes the test sequence.

Different test scenario data files may be created for different production system replications. Within a test scenario file 114, the various workloads are executed in the order listed. FIG. 4 illustrates an example of a test scenario file 400 that may include one or more test scenarios represented as an XML file in accordance with certain embodiments. FIG. 4 illustrates the test scenario file 400 as an XML file in accordance with certain embodiments. The test scenario file 400 identifies one or more test scenarios. Within each test scenario, the order in which one or more of the workloads are to be executed, is provided with the first time event first, followed by the second time event, etc. The test scenario file 400 identifies one or more workloads that may be executed in parallel (within the same time event).

The test scenario file 400 contains multiple scenarios: Scenario1, Scenario2, and Scenario3. Each scenario contains multiple workloads. For example, scenario1 contains workloads Daily1, Random1, and Daily2. The detail for the identified workloads are in the production system workload XML, file 300. So, looking in the production system workload XML file, there is a workload Daily1 composed of multiple "units of work", "work items", "tasks", "tests", and these are the programs to be run or the test scripts to be executed that replicate the work being done on the production system on the system under test 100.

For example, in FIG. 4, scenario 1 specifies running workloads Daily1, Random1 and Daily2. These workloads are executed sequentially. In FIG. 3, workload "Daily1" has two "units of work" (or "programs" or "test scripts") that begin at 05:00, and these would be started simultaneously at 05:00. When they both complete, for example at 06:15, the next "unit of work" is scheduled for 08:00, so the clock would be moved forward to 08:00, so that the Retrieve2 "unit of work" executes.

In certain embodiments, when the testing is completed for a specified time event, the test clock 118 is set to the start of the next time event to immediately start the next time event. In other embodiments, when the testing is completed for a specified time event, the test clock 118 is set to the start of the next time event minus a delta (e.g., a small delta, such as 20 seconds) to start the next time event after that delta. When the time for the next time event is reached, the tests associated with the next time event are run. This continues until all the test scenario(s) identified in the test script 131 are completed.

The system under test information file 116 is a data file that describes system specific information regarding one or more test systems to be tested. There may be one or more systems under test/LPARs that are part of the test scenario. The data file may contain entries for multiple systems under test that are being tested and for the workload generator systems. In certain embodiments, the data file is an XML file. In other embodiments, the data file may be implemented in any manner that describes the system information.

For example, for each system that is participating in the testing (the system under test and the workload generator), the system under test information file 116 includes:

a. System name: a unique system name b. System role: whether it is a workload generator or a system that is being tested c. Internet Protocol (IP) address: the IP address of the system under test d. User Identifier (userID) and Password: the userID and password to be used for running the tests. Any other system specific information may be included in this file.

FIG. 5 illustrates an example of a system under test information file 500 as an XML file in accordance with certain embodiments. The system under test information file 500 describes system information for systems: Archive1 and Archive2. For example, a retrieve may operate on both systems because data is retrieved from one system and stored into another system.

The test control program 110 controls the execution of the testing. The test control program 110 reads the specified test script 131, it then reads the test scenario data file 114 and extracts the specific scenarios from the test scenario file based on the specifications in the test script 131. For each identified scenario, the test control program 110 reads the production system workload file 112 and extracts the information regarding which programs to run and at what time. After the program run times are identified, the test control program 110 reads the system under test information data, and executes the workloads within the test scenarios in the order in which they are described (in time event order). When all processing for a specific time event has completed, the test control program 110 sets the test clock 118 to the begin time of the next time event, or the next time event minus a delta (if specified in the test script 131 or specified directly to the test control program 110 through a configuration file, startup parameters or some other means).

The test clock 118 provides the system under test 100 with the current date and time. Time-based events are determined by the test clock of the system under test 100. By manipulating the test clock 118, embodiments modify the progression of time within the system under test 100.

In certain embodiments, to reach a time-based event without having to wait for the actual time to pass, the test program code 110 changes the time of the system clock 140. While this may work on a dedicated test system 100, in a large test system 100 in which the system clock 140 is common to multiple LPARs (or subsystems), changing the system clock 140 may affect other non-test related activities and may be a limiting factor on the number and types of tests that may be run simultaneously.

Thus, embodiments also create one or more test clocks 118 that is used by the product being tested. The test clock 118 may be manipulated as needed without affecting any other components, aside from the components that refer to this test clock 118. The test clock 118 may be created as a Dynamic Load Library (DLL) or any long running task) that is 1) built as part of the product for testing purposes or 2) may be a separate DLL that is set and reset by calls from the test script 131.

With embodiments, for the separate DLL, the system under test 100 does not need to be modified in any way for the testing to be performed. The test clock 118 may be made aware of the time requirements of the different test programs 130, 151. For example, the test clock 118 would know which test script/program is currently running and what are the time requirements for running the other registered components. This allows the test clock 118 to select the next future time based on the test needs. This functionality is enabled through an internal array in the test clock.

In certain embodiments, the internal array contains the following variables:
User: a name of the running test script/program.
State: two possible states (working/waiting).
In the "working" state the test script is currently running.
In the "waiting" state, the test script is complete and is waiting for a next execution time.
Next time: this is the time (date/time) at which the test script will run next.

With embodiments, the access to and modification of the internal array is supported by the following methods:
addUser(userName): to add a user to the array
removeUser(userName): to remove a user from the array
setState(userName, State): to set a state of a user to working or waiting
setNextTime(userName, time): to set a next time that the user will run. This method is used by the running script to set the "nextTime" at which it will run. This is called directly before the getNextTime( ) method.
getNextTime( ) called at the end of the execution of a working test script. This method returns the lowest value/closest time that has been set. If any user is still in the working state, then the method returns a −1.
If a −1 is returned then the running test script sets the "NextTime" and goes into a waiting state.
If a time value is returned, then the running test script sets the test clock to the next time (NextTime) minus a delta (e.g., a small user defined delta (e.g., in seconds)) and then goes into a waiting mode.

Using the separate DLL allows for the coordination of a set of independently executing distributed test scripts. In particular, this allows for the creation of any configuration of tests across any number of systems (e.g., LPARs) that are all synchronized through a single test clock.

Figure 6:
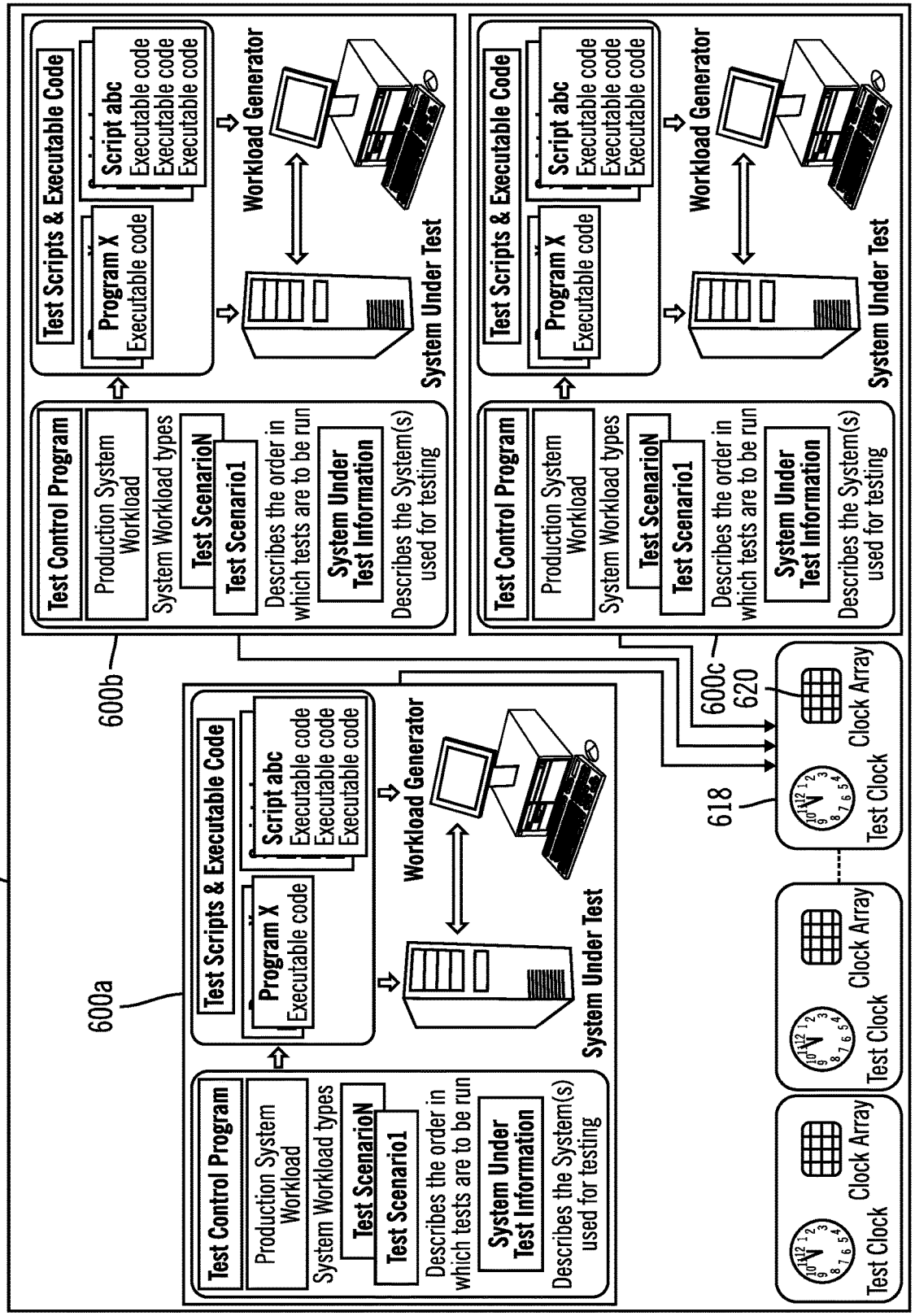
FIG. 6 illustrates a computing environment representing sharing of one or more system clock(s) by multiple systems under test in accordance with certain embodiments.

FIG. 6 illustrates a computing environment representing sharing of one or more system clock(s) by multiple systems under test in accordance with certain embodiments. In FIG. 6, the multiple systems under test 600a, 600b, and 600c are running a series of independent test scenarios and, at the same time, are dependent from an overall testing perspective. For example, the first test scenario may include a series of load and retrieval tests; the second test scenario may include database maintenance tasks (e.g., runstats and reorgs); the third set of test scenarios may be the addition, update and expiration of userids on the system under test; and the fourth test scenario may be the execution of the payroll run. In FIG. 6, there are multiple test clocks. Also, in FIG. 6, the multiple systems under test 600a, 600b, and 600c are sharing a test clock 618, which has an internal array 620.

In both embodiments, the test clock 118 may be set and reset as the testing progresses to a specified date/time. This allows a time-based event (or series of events) to occur in a much shorter period of real time. For example, if data is set up to expire in 7 years, rather than having to wait 7 years, the test clock 118 may be set to 7 years ahead of the current date, thus causing the data to be expired immediately.

With embodiments, time compression in the system under test 100 is achieved by de-duplication, process focus, and elimination.

As for de-duplication, in this case, the same workload is performed once versus multiple times. For example, in the case in which the production system workload file 112 has workloads defined as being daily, weekly, and monthly, the daily workload is run once per week, since the other days in the week will all be the same. This may differ by implementation, so, for a banking system, the daily workload may differ from the weekend workload, while for a hospital system, the work day and week end workloads may be the same.

As for process focus, in this case, the focus is on a single process (or test), so only the events that are related to that test are taken into consideration, and the time that would fall between the occurrence of those events is eliminated. An example of this was described above and resulted in a 284:1 compression ratio.

As for elimination, as the testing progresses through the test scenario data file, as a time event related workload is completed, the test clock 118 is moved forward to the start time of the next event, thus eliminating the "time wait" between both events.

Figure 7:
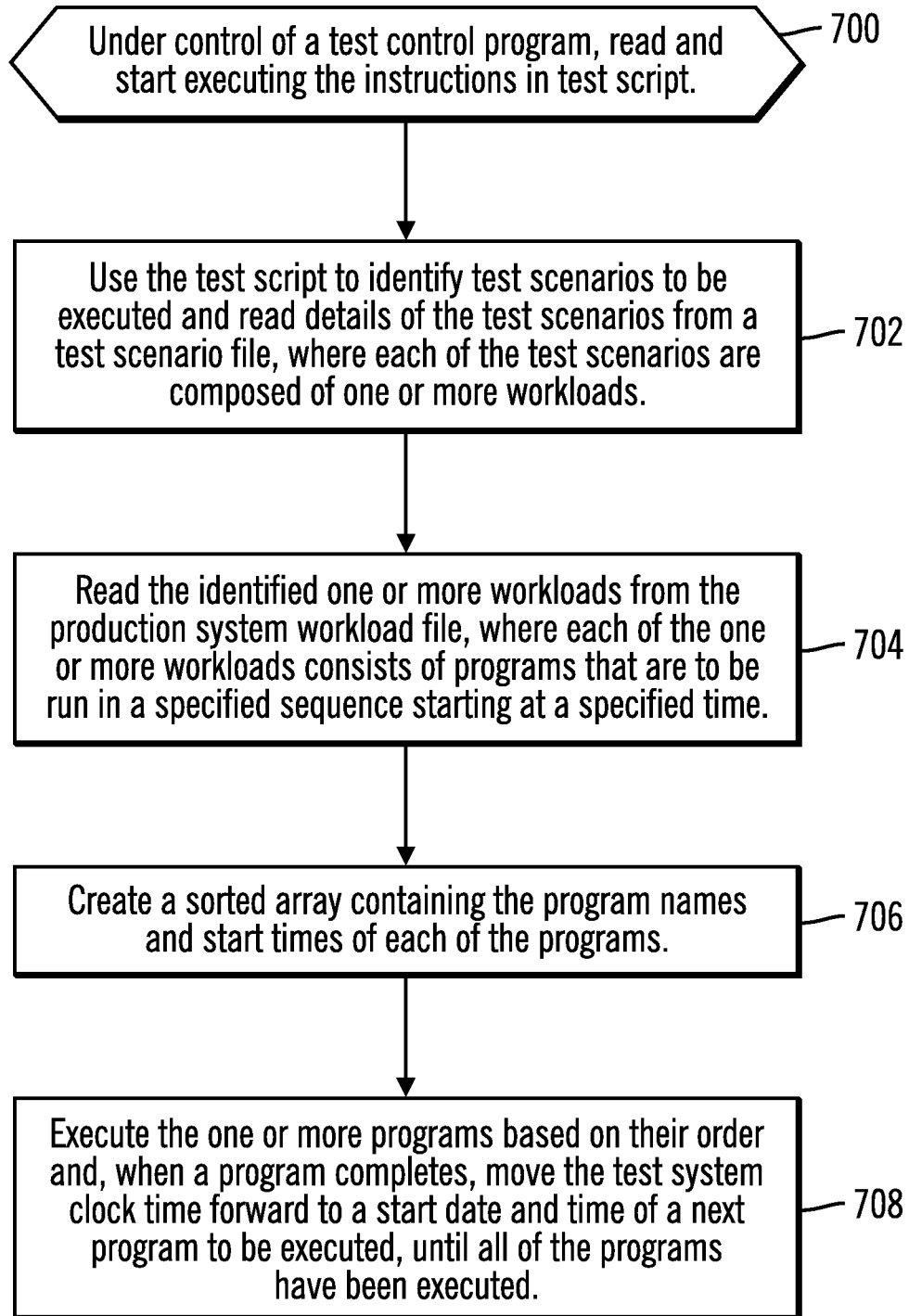
FIG. 7 illustrates, in a flow chart, operations for controlling test progression by manipulating a test clock under control of a test control program in accordance with certain embodiments.
Figure 8:
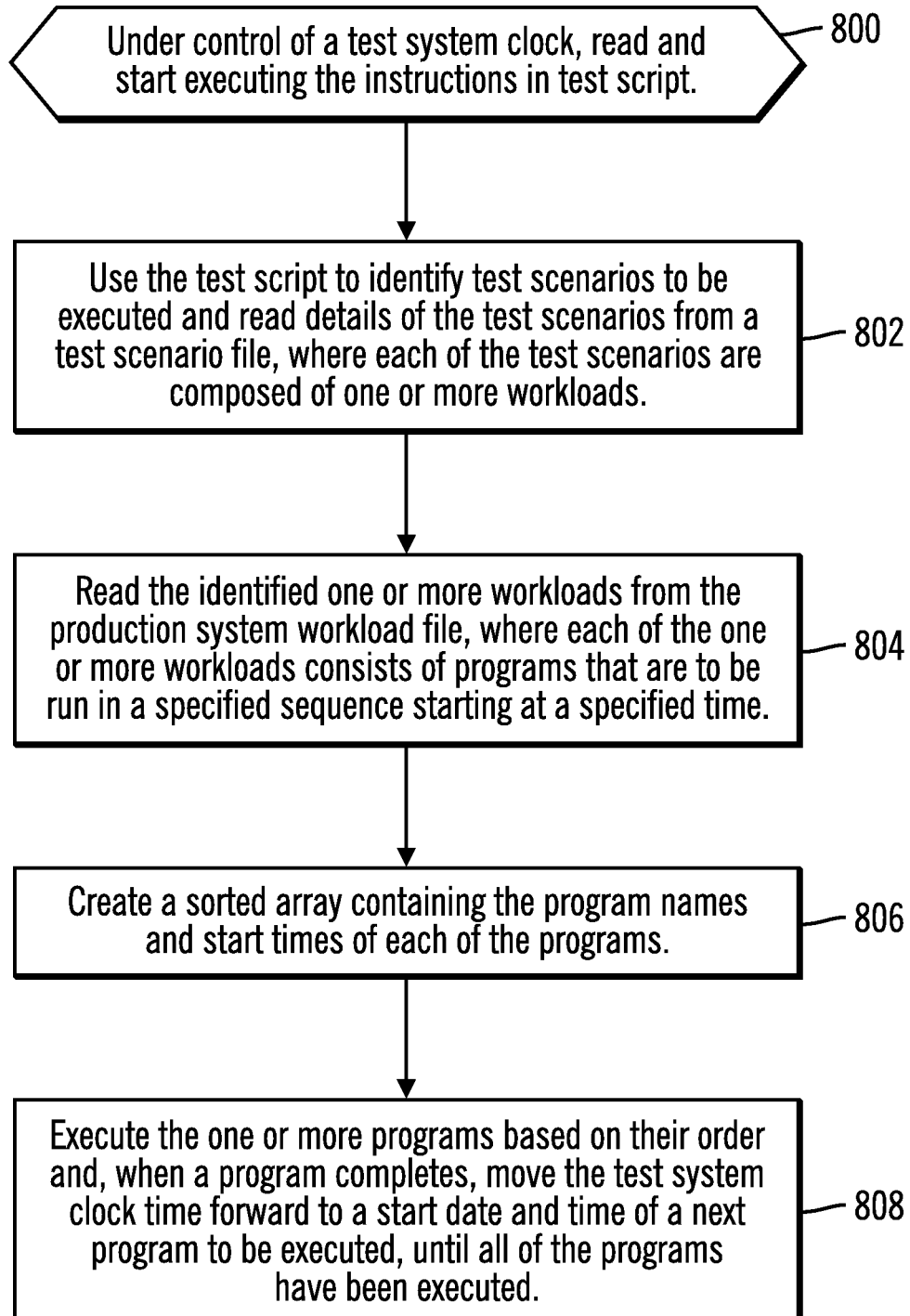
FIG. 8 illustrates, in a flow chart, operations for controlling test progression by manipulating a test clock under control of a test clock in accordance with certain embodiments.

FIG. 7 illustrates, in a flow chart, operations for controlling test progression by manipulating a test clock under control of a test control program 110 in accordance with certain embodiments. In FIG. 7, the test control program 110 controls the test progression by manipulating the test clock 118. Control begins in FIG. 7 at block 700, with the test control program 110 reading and starting execution of the instructions in a test script 131. In block 702, the test control program 110 uses the test script 131 to identify one or more test scenarios to be executed and reads details of the one or more test scenarios from the test scenario file 114, where each of these one or more test scenarios are composed of one or more workloads. In block 704, the test control program 110 reads the identified one or more workloads from the production system workload file 112, where each of the one or more workloads consists of programs 130, 151 that are to be run in a specified sequence starting at a specified time. In block 706, the test control program 110 creates a sorted array containing the program names and start times of each of the programs 130, 151. In block 708, the test control program 110 executes the one or more programs 130, 151 based on their order and, when a program 130, 151 completes, moves the test clock 118 time forward to a start time of a next program 130, 151 to be executed, until all of the programs 130, 151 have been executed. FIG. 8 illustrates, in a flow chart, operations for controlling test progression by manipulating a test clock under control of the test clock 118 in accordance with certain embodiments. In certain embodiments, the test control program 110 logic is embedded in the test clock 118 for executing time-based events. In FIG. 8, the functionality of the test control program 110 is embedded in the test clock 118, and the test clock 118 controls the test progression by manipulating the test clock 118.

Control begins in FIG. 8 at block 800, with the test clock 118 reading and starting execution of the instructions in a test script 131. In block 802, the test clock 118 uses the test script 131 to identify one or more test scenarios to be executed and reads details of the one or more test scenarios from the test scenario file 114, where each of these one or more test scenarios are composed of one or more workloads. In block 804, the test clock 118 reads the identified one or more workloads from the production system workload file 112, where each of the one or more workloads consists of programs 130, 151 that are to be run in a specified sequence starting at a specified time. In block 806, the test clock 118 creates a sorted array containing the program names and start times of each of the programs 130, 151. In block 808, the test clock 118 executes the one or more programs 130, 151 based on their order and, when a program 130, 151 completes, moves the test clock 118 time forward to a start time of a next program 130, 151 to be executed, until all of the programs 130, 151 have been executed.

Embodiments provide a test clock for use that is independent of a computer system clock and, while running a program that includes one or more time-based events, dynamically setting the test clock to a specified date and time for each of the one or more time-based events based on progress of the running program.

Embodiments perform de-duplication to determine a smaller number of times to perform a workload for the program than would be performed in a production environment. Embodiments provide an ability to focus the testing on a single system function so that any time-based events that are related to the single system function are performed, while time that would fall between occurrences of the time-based events is eliminated. Embodiments allow for multi-system synchronization by providing access to the time of the test clock and allowing resetting of the time from multiple tests across multiple systems. Embodiments create a data driven environment using a test script data file that describes systems and tests to be run on the systems, wherein the test clock is aware of test progression and acts as a test controller that adjusts time accordingly. With embodiments, the setting and re-setting of the test clock is performed either by the test control program 110 (e.g., using a test script file 131) or internally by the test clock 118.

Embodiments provide realistic modeling of production workloads under time compression, by supporting workload mix-specific levels of time compression.

Figure 9:
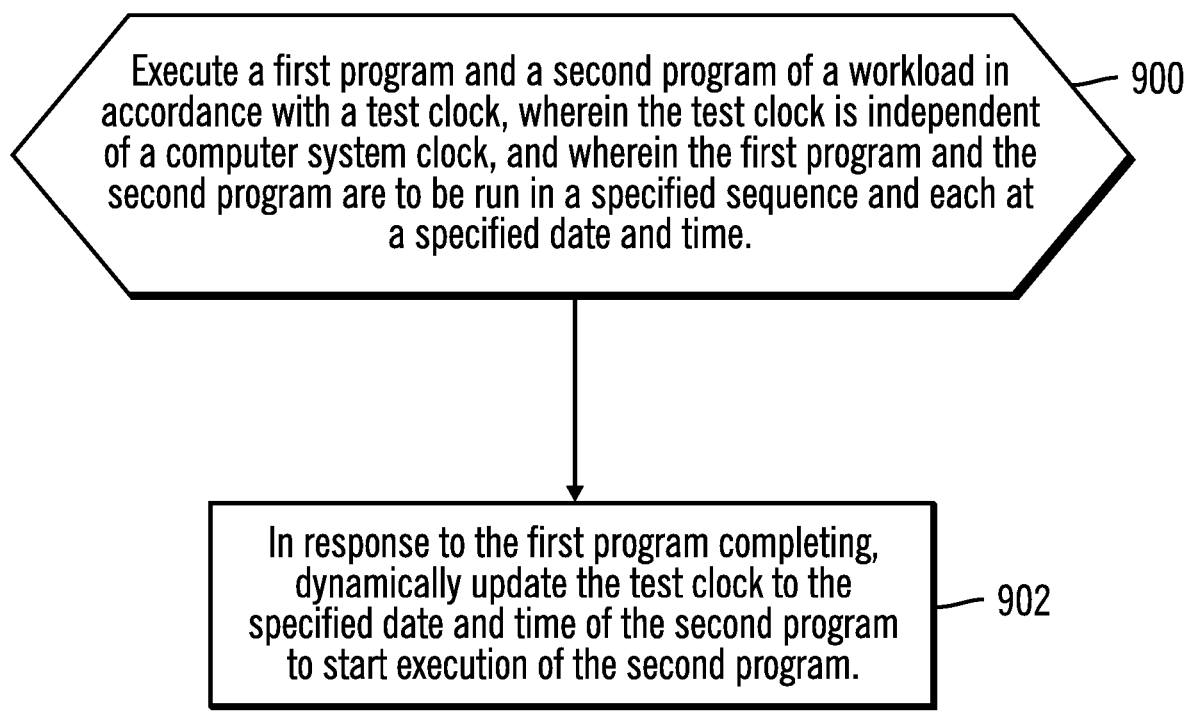
FIG. 9 illustrates, in a flow chart, operations for controlling test progression of a first program and a second program of a workload in accordance with a test clock in accordance with certain embodiments.

FIG. 9 illustrates, in a flow chart, operations for controlling test progression of a first program and a second program of a workload in accordance with a test clock in accordance with certain embodiments. Control begins at block 900 with execution of a first program and a second program of a workload in accordance with a test clock, wherein the test clock is independent of a computer system clock, and wherein the first program and the second program are to be run in a specified sequence and each at a specified date and time. In block 902, in response to the first program completing, the test clock is dynamically updated to the specified date and time of the second program to start execution of the second program.

With embodiments, the updating of the test clock is performed by one of a test control program and the test clock. With embodiments, the specified date and time of the second program is a start date and time of the second program minus a delta. With embodiments, a smaller number of times to perform the workload is determined. With embodiments, the test clock is accessed by multiple systems. With embodiments, the execution of the first program and the second program of the workload is in accordance with a test scenario.

Figure 10:
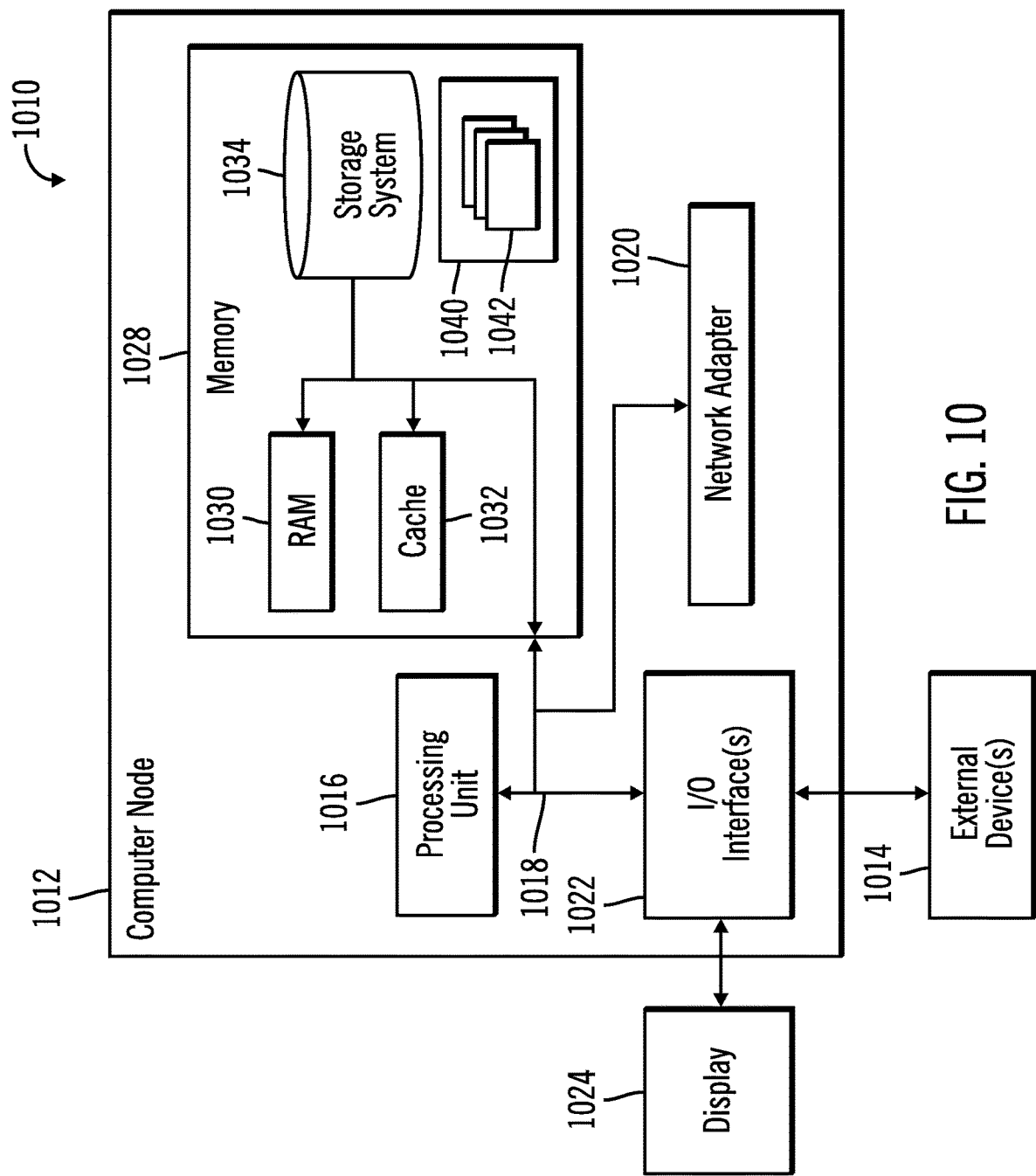
FIG. 10 illustrates a computing node in accordance with certain embodiments.

FIG. 10 illustrates a computing environment 1010 in accordance with certain embodiments. In certain embodiments, the computing environment is a cloud computing environment. Referring to FIG. 10, computer node 1012 is only one example of a suitable computing node and is not intended to suggest any limitation as to the scope of use or functionality of embodiments of the invention described herein. Regardless, computer node 1012 is capable of being implemented and/or performing any of the functionality set forth hereinabove.

The computer node 1012 may be a computer system, which is operational with numerous other general purpose or special purpose computing system environments or configurations. Examples of well-known computing systems, environments, and/or configurations that may be suitable for use with computer node 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1012 may be described in the general context of computer system executable instructions, such as program modules, being executed by a computer system. Generally, program modules may include routines, programs, objects, components, logic, data structures, and so on that perform particular tasks or implement particular abstract data types. Computer node 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer node 1012 in cloud computing node 1010 is shown in the form of a general-purpose computing device. The components of computer node 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1012 typically includes a variety of computer system readable media. Such media may be any available media that is accessible by computer node 1012, and it includes both volatile and non-volatile media, removable and non-removable media.

System memory 1028 can include computer system readable media in the form of volatile memory, such as random access memory (RAM) 1030 and/or cache memory 1032. Computer node 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer node 1012 may also communicate with one or more external devices 1014 such as a keyboard, a pointing device, a display 1024, etc.; one or more devices that enable a user to interact with computer node 1012; and/or any devices (e.g., network card, modem, etc.) that enable computer node 1012 to communicate with one or more other computing devices. Such communication can occur via Input/Output (I/O) interfaces 1022. Still yet, computer node 1012 can communicate with one or more networks such as a local area network (LAN), a general wide area network (WAN), and/or a public network (e.g., the Internet) via network adapter 1020. As depicted, network adapter 1020 communicates with the other components of computer node 1012 via bus 1018. It should be understood that although not shown, other hardware and/or software components could be used in conjunction with computer node 1012. Examples, include, but are not limited to: microcode, device drivers, redundant processing units, external disk drive arrays, RAID systems, tape drives, and data archival storage systems, etc.

In certain embodiments, the system under test 100 and/or the workload generator 150 has the architecture of computer node 1012. In certain embodiments, the system under test 100 and/or the workload generator 150 is part of a cloud environment. In certain alternative embodiments, the system under test 100 and/or the workload generator 150 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.'

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
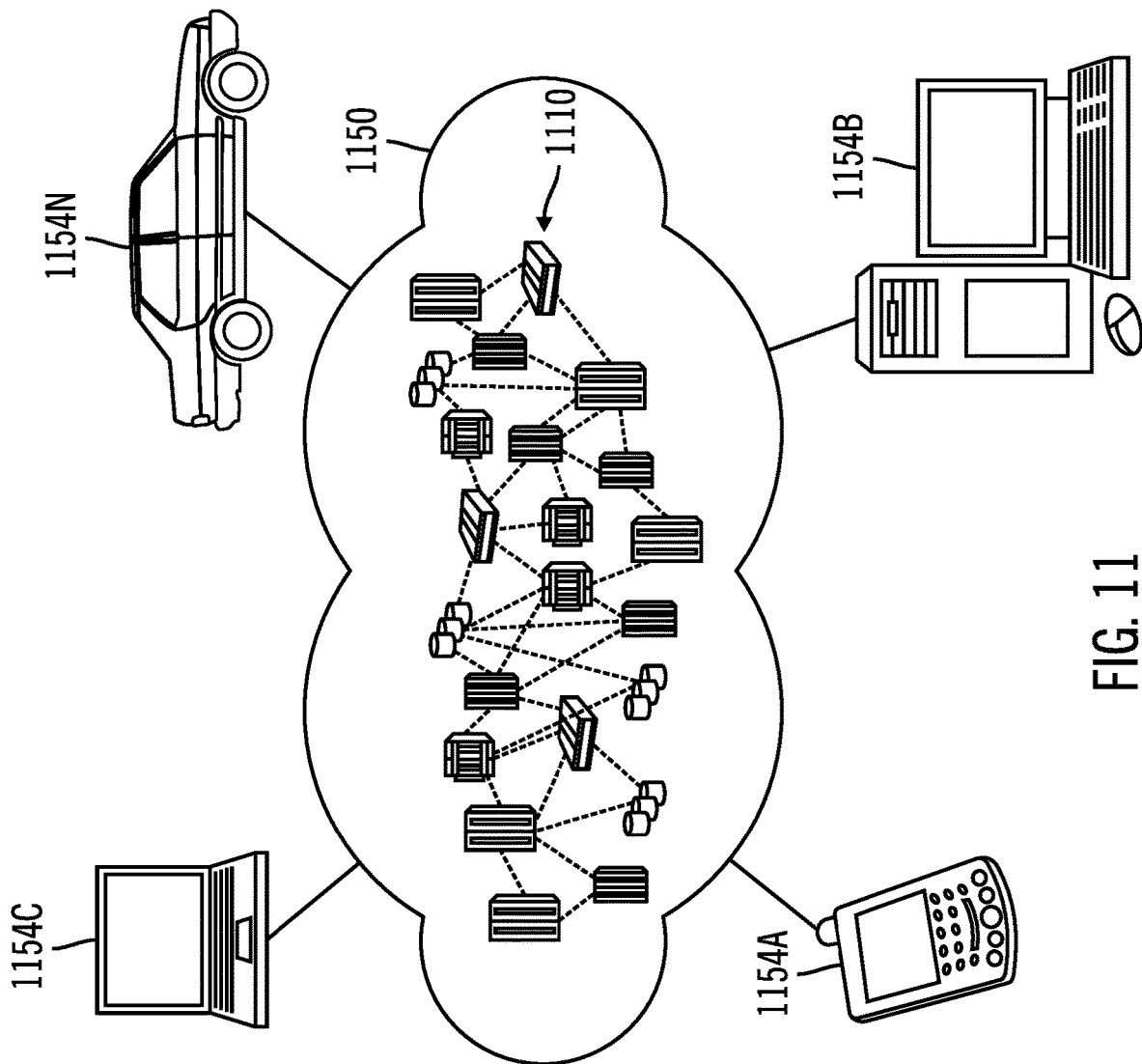
FIG. 11 illustrates a cloud computing environment in accordance with certain embodiments.

Referring now to FIG. 11, illustrative cloud computing environment 1150 is depicted. As shown, cloud computing environment 1150 comprises one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
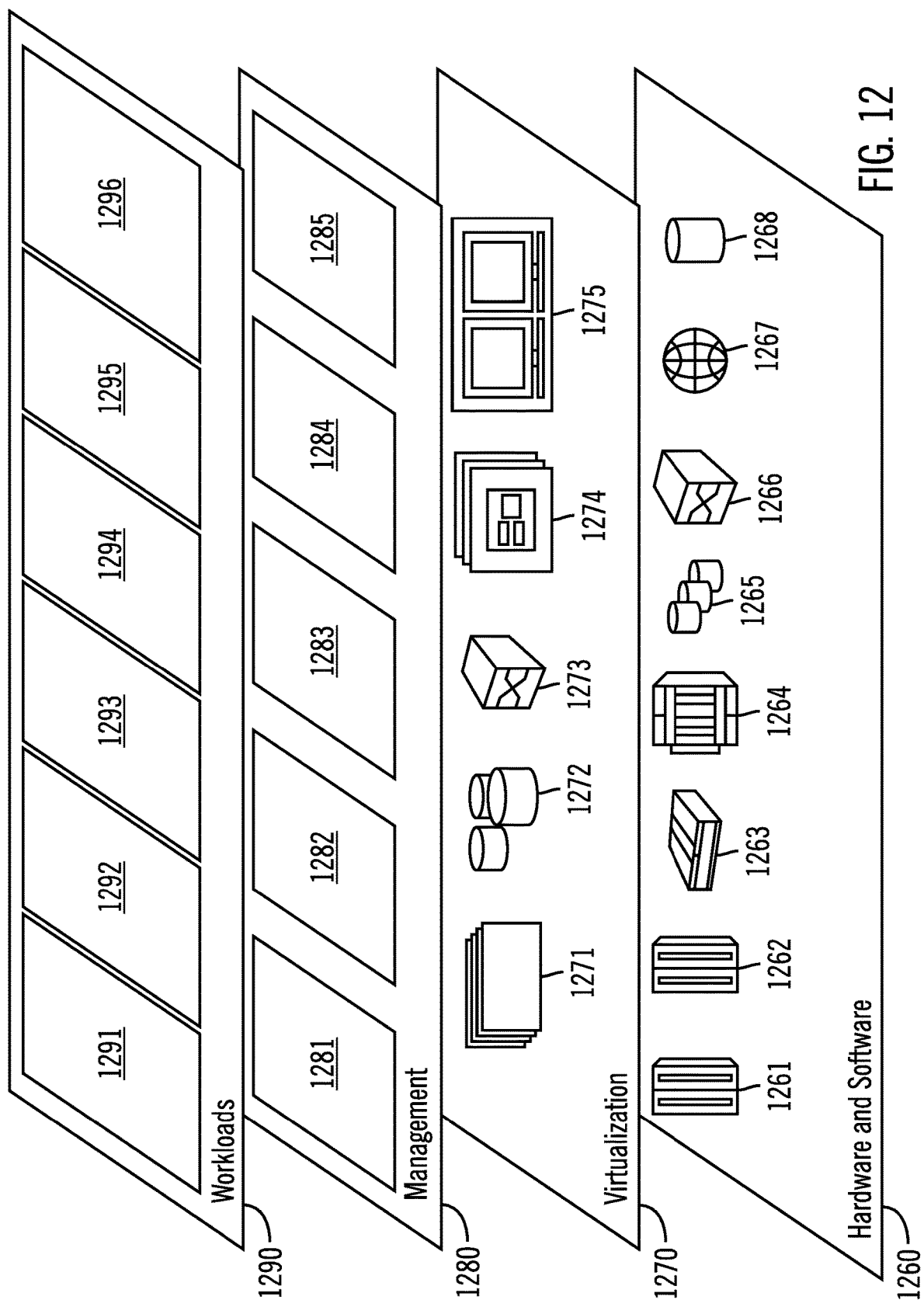
FIG. 12 illustrates abstraction model layers in accordance with certain embodiments.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and system testing using time compression 1296.

Thus, in certain embodiments, software or a program, implementing system testing using time compression in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
    accessing one or more test scenarios, wherein each of the one or more test scenarios includes workloads, wherein each workload of the workloads has a different frequency of executing that workload;
    accessing, for a workload of the workloads, a workload file that describes a first program, a second program, and the frequency of executing the workload; and
    executing the workload based on the frequency and by executing the first program and the second program in accordance with a test clock that includes an internal array, wherein the internal array identifies a first date and time that the first program is to be executed and a second date and time that the second program is to be executed, and wherein the test clock is dynamically updated to reflect the second date and time upon completing the execution of the first program.

2. The computer-implemented method of claim 1, wherein the test clock is dynamically updated by one of a test control program and the test clock in accordance with the internal array.

3. The computer-implemented method of claim 1, wherein the second date and time is a start date and time of the second program minus a delta.

4. The computer-implemented method of claim 1, wherein the first program and the second program for the workload of the one or more workloads are executed fewer times in a test environment than in a production environment.

5. The computer-implemented method of claim 1, wherein the test clock is accessed by multiple systems.

6. The computer-implemented method of claim 1, wherein the one or more test scenarios are identified in a test script.

7. The computer-implemented method of claim 1, wherein a Software as a Service (SaaS) is configured to perform the operations of the computer-implemented method.

* * * * *